March 28, 1967 F. MUHLENBRUCH 3,311,217
ARTICLE-HANDLING METHOD AND APPARATUS
Filed Sept. 23, 1965 5 Sheets-Sheet 1

INVENTOR.
FRED MUHLENBRUCH
BY Percy Freeman
ATTORNEY

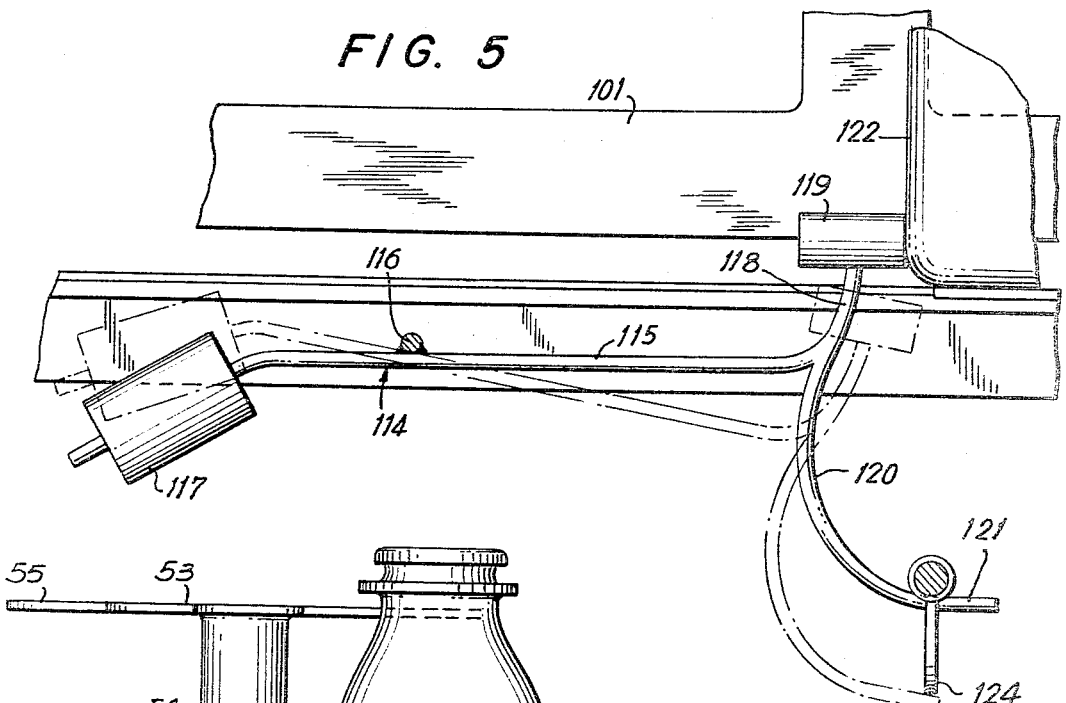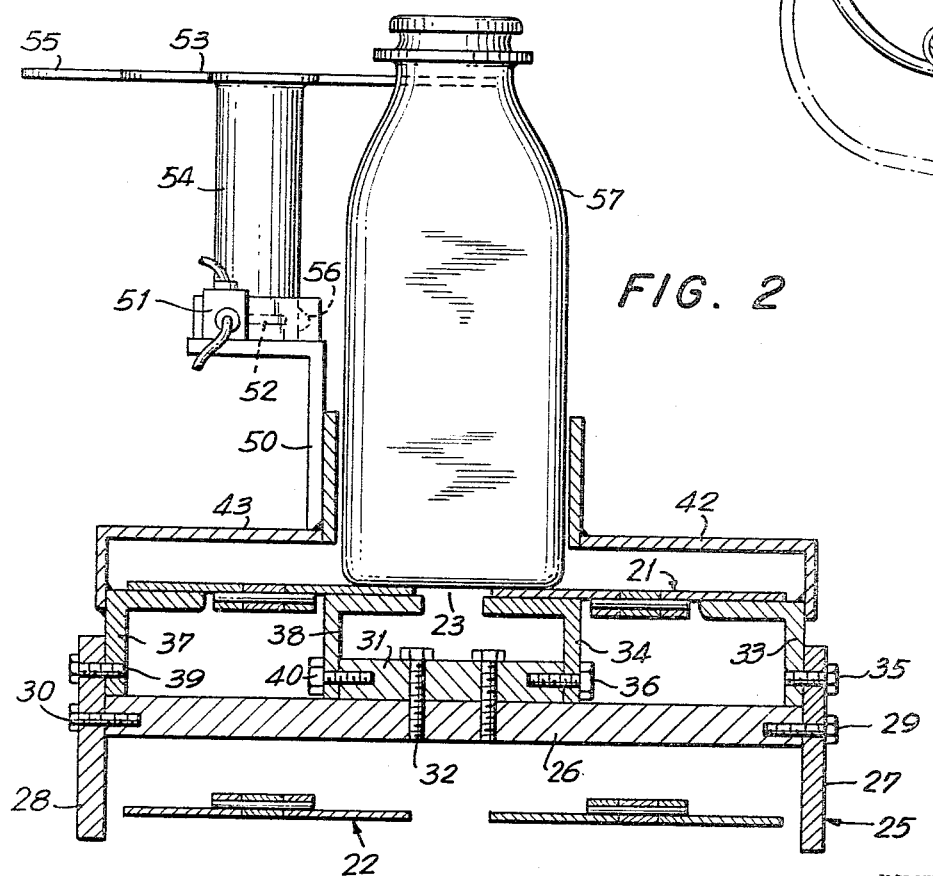

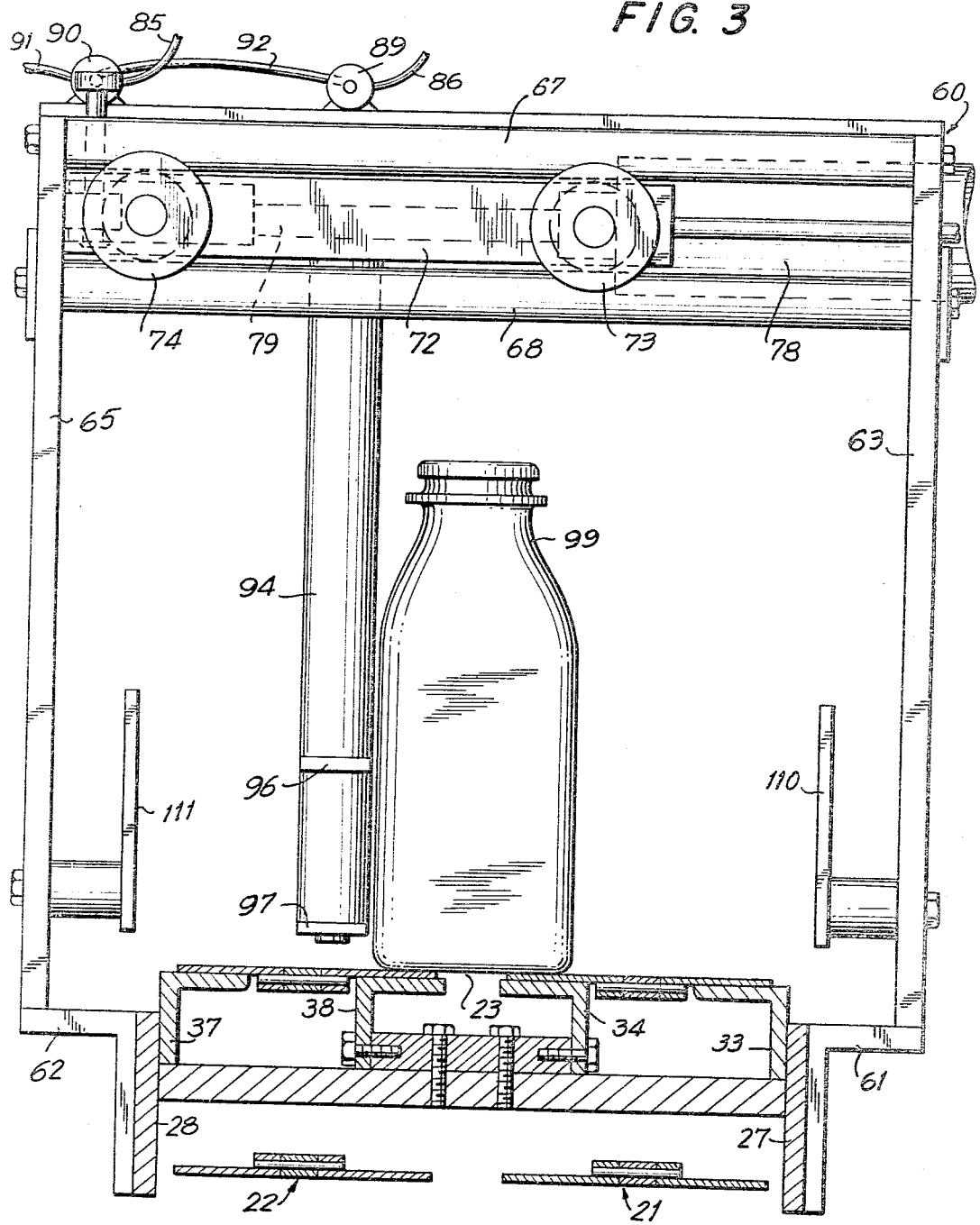

March 28, 1967 F. MUHLENBRUCH 3,311,217
ARTICLE-HANDLING METHOD AND APPARATUS
Filed Sept. 23, 1965 5 Sheets-Sheet 4

INVENTOR.
FRED MUHLENBRUCH
BY
*Percy Freeman*
ATTORNEY

March 28, 1967  F. MUHLENBRUCH  3,311,217
ARTICLE-HANDLING METHOD AND APPARATUS
Filed Sept. 23, 1965  5 Sheets-Sheet 5

INVENTOR.
FRED MUHLENBRUCH
BY
Percy Freeman
ATTORNEY

United States Patent Office 3,311,217
Patented Mar. 28, 1967

3,311,217
ARTICLE-HANDLING METHOD AND
APPARATUS
Fred Muhlenbruch, Flushing, N.Y., assignor to Dairy Conveyor Corporation, College Point, N.Y., a corporation of New York
Filed Sept. 23, 1965, Ser. No. 489,584
3 Claims. (Cl. 198—31)

This invention relates generally to materials handling, and embraces a unique method and apparatus for the handling of separate articles or discrete quantities.

While the device and process of the instant invention have been primarily developed and employed for use in the handling of containers, such as milk bottles, and the like, and will be illustrated and described hereinafter with particular reference thereto, it is appreciated that the advantageous features disclosed and claimed herein are well suited for a variety of applications, all of which are intended to be comprehended herein.

As is well known to those versed in the art, the collection or grouping of bottles, or other containers, and their arrangement for packaging, as in a case or carton, have presented serious problems, including that of breakage and other damage, waste of the contents, down time of the apparatus, and others.

Accordingly, it is an important object of the present invention to provide a unique method and apparatus which overcomes the above-mentioned difficulties, and wherein the collection and desired arrangement of containers or other articles is completely automatically, efficiently and quickly obtained, without damage to the articles, and in a safe and entirely reliable manner to achieve continuous, unattended operation over extremely long periods of time.

It is a more particular object of the present invention to provide a highly improved method and apparatus for collecting and arranging articles from a supply of such articles proceeding along a predetermined path, wherein certain of the articles are displaced laterally out of the path and their movement continued in the direction of the path to assume, at a collection station, the desired array of articles for packing.

It is still another object of the present invention to provide a method and apparatus of article handling having the advantageous characteristics mentioned in the preceding paragraphs, which is extremely simple in operation, durable and reliable, and which can be economically practiced to effect substantial economies in use.

Other objects of the present invention will become apparent upon reading the following specification and referring to the acompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 2 is a transverse sectional elevational view taken generally along the line 2—2 of FIGURE 1.

FIGURE 3 is a transverse sectional elevational view taken generally along the line 3—3 of FIGURE 1.

FIGURE 5 is a partial sectional elevational view taken generally along the line 5—5 of FIGURE 4.

Figure 1:
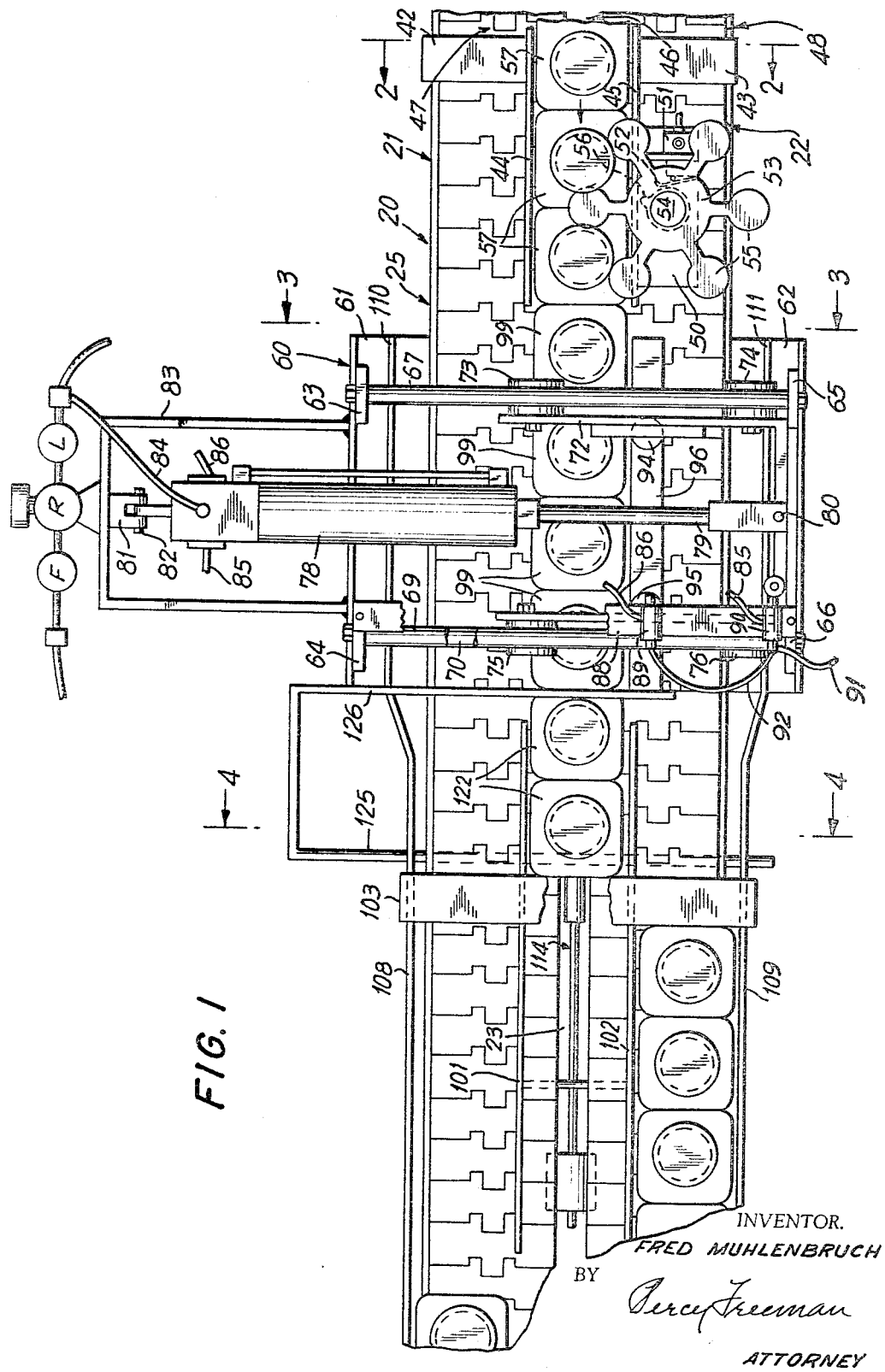
FIGURE 1 is a top plan view showing a conveyor apparatus constructed in accordance with the teachings of the present invention.

Referring now more particularly to the drawings, and specifically to FIGURE 1 thereof, a conveyor is there generally designated 20 and may include a pair of belts or slat-like link chains 21 and 22 disposed in side-by-side spaced relation and trained about suitable supporting sprockets (not shown). The chains 21 and 22 may be of the endless type, including a plurality of slats pivotally linked together, each conveyor chain or belt having its upper run generally horizontal and coplanar with the other. The upper runs of the conveyor chains or belts 21 and 22 extend in substantial parallelism and are spaced apart, as at 23.

Figure 4:
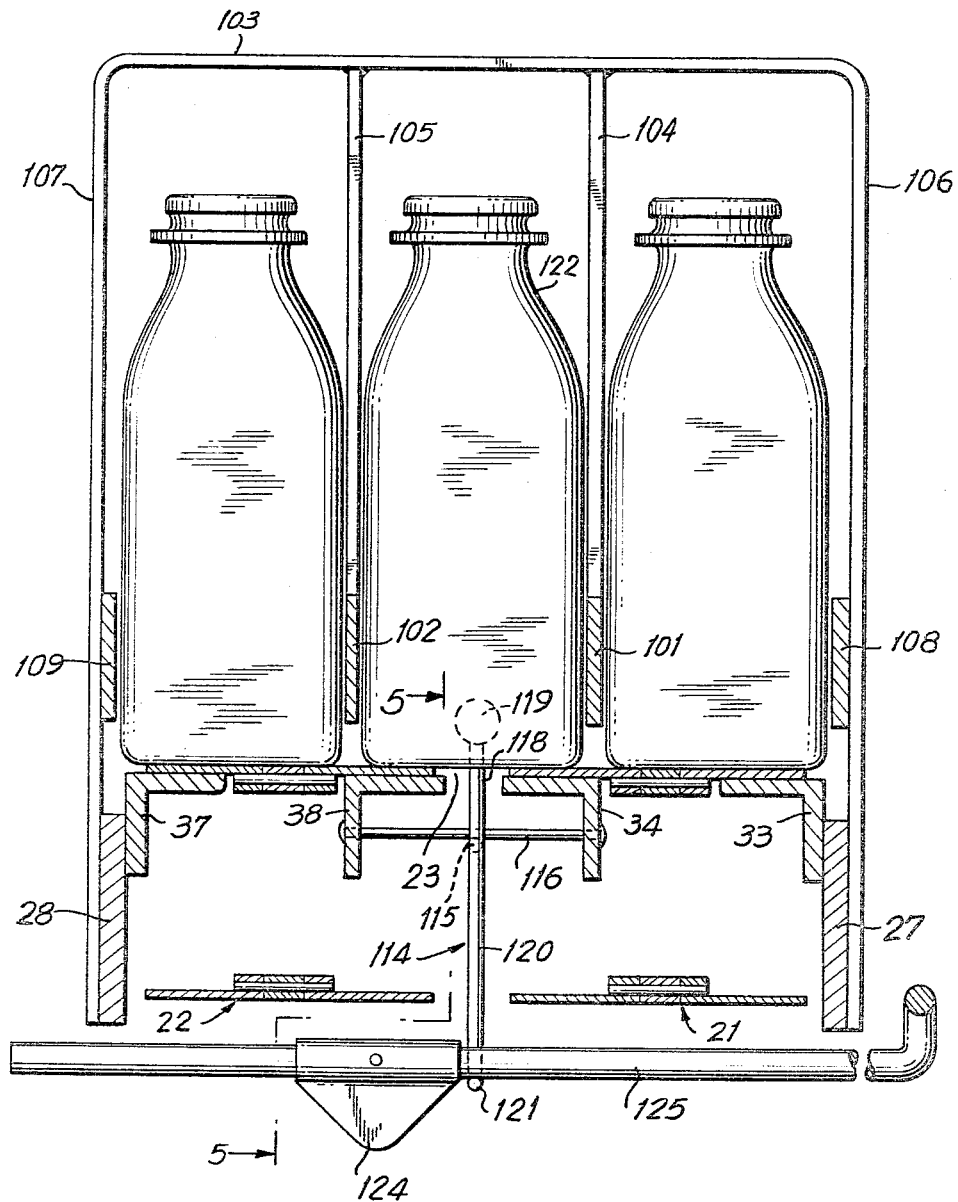
FIGURE 4 is a transverse sectional elevational view taken generally along the line 4—4 of FIGURE 1.

In FIGURES 2, 3 and 4, are best shown the conveyor support structure or frame, generally designated 25, which may assume a generally horizontally disposed I-shaped cross section having a horizontal web 26 and longitudinally extending, upstanding end flanges 27 and 28 secured to the web, as by fasteners 29 and 30. A mounting block or bar 31 may be fixed to the upper side of frame web 26, as by fasteners 32, and a pair of longitudinally extending angle members 33 and 34 may be secured along their length to the flange 27 and block 31, respectively, as by fasteners 35 and 36. The angle members 33 and 34 each have upper horizontal flanges serving to support the upper run of link belt 21. A similar pair of elongate angle members 37 and 38 are respectively secured to flange 28 and bar 31, as by fasteners 39 and 40, to provide upper horizontal flanges for supporting the upper run of link belt 22.

At the inlet or upstream end of conveyor 20, the right-hand end as seen in FIGURE 1, there are provided a pair of angle pieces or brackets 42 and 43, respectively secured, as by welding or other suitable means, to angle members 33 and 37 and extending upward therferom, and thence inward partially over respective conveyors 21 and 22. The angle pieces or brackets 42 and 43 each terminate at its inner end short of the interchain space 23, and are there respectively provided with upstanding, longitudinally extending rails or guides 44 and 45. In the illustrated embodiment, the brackets 42 and 43 each extend inward toward each other about one-third of the combined lateral extent of chains 21 and 22, and space 23. By this means, the conveyor 20 is longitudinally subdivided into an intermediate or primary section 46, between the rails 44 and 45, and a pair of outer or side sections 47 and 48, respectively laterally outward of rails 44 and 45. The intermediate conveyor section 46 utilizes the inner edge portions or margins of both conveyors 21 and 22, while the outer or side sections 47 and 48 respectively utilize the remainders of the conveyors.

Upstanding from the guide rail 45 is a support bracket 50 which carries a normally closed fluid switch or valve 51 having an operating element 52 projecting from the switch. A rotor 53 is disposed generally horizontally over the bracket 50 and mounted on the latter, as by a generally vertical shaft 54 for rotation about the shaft axis. The rotor 53 may be spiderlike and include a plurality of radially extending arms 55 projecting across the intermediate conveyor section 46 and swingable with the rotor out of position across the intermediate conveyor section. A boss or cam 56 may be carried by the shaft 54 for engagement with the switch arm 52 to actuate and open the switch.

Figure 6:
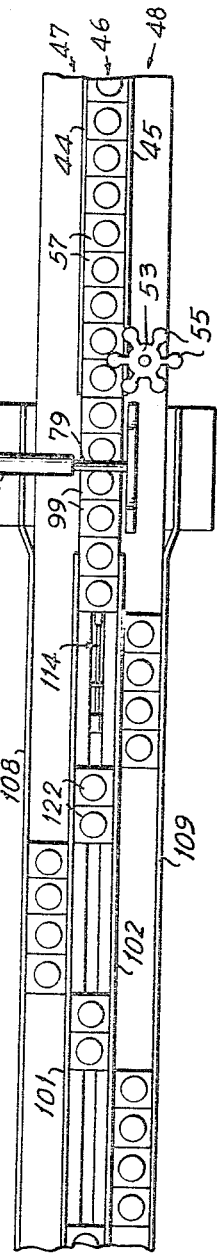
FIGURE 6 is a somewhat diagrammatic plan view illustrating practice of the method of the instant invention.

As best seen in FIGURES 1 and 6, a series or row of articles, such as milk containers 57, or other, may be conveyed along the intermediate conveyor section 46 between the rails 44 and 45. Of course, appropriate driving power is applied to the conveyor chains 21 and 22 to effect the desired single-file movement of articles 57 along the intermediate conveyor section 46. As the articles 57 pass the location of rotor 53, the rotor arms 55 successively engage with and are rotated by each subsequent article 57. In this manner, the rotor 53 senses and counts the passage of articles 57 moving along the intermediate conveyor section 46, and upon passage of a predetermined number of articles the boss 56 is rotated sufficiently to actuate switch 51. In the illustrated embodiment, the switch 51 is actuated upon passage of every sixth article 57.

Downstream of the sensing rotor 53, there is provided along the conveyor 20 an article-displacing mechanism, generally designated 60. The displacing mechanism 60 includes a pair of longitudinally extending angle members or supports 61 and 62, respectively secured to flanges 27 and 28 by any suitable means. Upstanding from the support 61 may be a pair of standards 63 and 64, spaced along the conveyor 20, and a similar pair of upstanding standards 65 and 66 may be provided on the support 62. A pair of generally horizontal, vertically spaced rails or ways 67 and 68 may extend between the standards 63 and 65, entirely across the conveyor 20, and, a similar pair of horizontal, vertically spaced rails or ways 69 and 70 may extend between the standards 64 and 66 entirely across the conveyor 20. A generally horizontally disposed, open or U-shaped carriage 72 is interposed between the pairs of rails 67 and 68, and 69 and 70, and provided with overhung rollers or wheels 73, 74, 75 and 76 mounted for rolling movement along the rails.

More specifically, the rollers 73 and 74 are carried by the upstream side of carriage 72 and rollably mounted on the ways or rails 67 and 68, while the rollers 75 and 76 are carried on the downstream side of the carriage and mounted for rolling movement along the rails 69 and 70. In this manner, the carriage 72 is mounted for horizontal reciprocation back and forth over the conveyor 20.

A fluid operated cylinder 78 extends from one side of the conveyor 20, the upper side as seen in FIGURE 1, into the open carriage 72 and includes an extensile and retractile piston rod 79 connected to the carriage, as by a fastener 80, for effecting lateral or transverse carriage movement. The operating cylinder has its other end suitably mounted, as by a clevis 81 and a horizontal pin 82 outboard of the conveyor 20, on a supporting structure or framework 83 upstanding from the support 61. A suitable fluid-supply conduit 84 is connected to the cylinder 78, and additional operating conduits 85 and 86 are connected to the cylinder.

In addition, a support bar 88 extends between the standards 64 and 66, over the rails 69 and 70, and carries a pair of control switches or valves 89 and 90 located in the path of movement of carriage 72 for engagement thereby. The control switches 89 and 90 are provided with supply conduits 91 and 92, and are also connected to cylinder conduits 85 and 86, as will be described hereinafter in greater detail.

Rigidly depending from the carriage 72 are a pair of elongate members or rods 94 and 95, and divider or pusher bars 96 and 97 extend between lower regions of the rods 94 and 95, longitudinally of the conveyor 20. Thus, upon reciprocation of the carriage 72 laterally with respect to the conveyor 20, the pusher bars 96 and 97 cause lateral displacement of the articles or containers 99 on the intermediate conveyor section 46 located in the path of lateral movement of the pusher bars. In the illustrated embodiment, the pusher bars 96 and 97 are of a length sufficient to effect lateral displacement of four containers 99. As the guide rails 44 and 45 terminate short of the pusher bars 96 and 97, the latter are free to effect their lateral movement and article displacement.

Downstream of the pusher bars 96 and 97 there are provided additional guide rails 101 and 102 in respective longitudinal alignment with the upstream guide rails 44 and 45, which downstream guide rails serve to subdivide the downstream region of the conveyor 20 into the intermediate and outer or side conveyor sections. The downstream guide rails 101 and 102 are carried by a bridge-like supporting structure 103 extending laterally over and across the conveyor 20 and having a pair of laterally spaced, intermediate depending members or legs 104 and 105, see FIGURE 4. The intermediate depending legs 104 and 105, may serve to carry the intermediate guide rails 101 and 102. The bridge 103 may include outer depending legs 106 and 107 respectively fixed to flanges 27 and 28, by any suitable means. Additional, outer guides 108 and 109 may be carried by respective legs 106 and 107 to define outer rails along respective outer or side conveyor sections 47 and 48. The outer rails 108 and 109 may include upstream sections in the region of displacement mechanism 60, as at 110 and 111 respectively secured to standards 63, 64, and standards 65, 66.

A stop mechanism is generally designated 114 and may include an elongate arm 115 extending along the interchain space 23 downstream of the displacing mechanism 60. The stop mechanism is best seen in FIGURE 5, as including the elongate member 115 being mounted intermediate its ends for rotation about a generally horizontal pivot 116 extending laterally of the conveyor 20. On the downstream end of arm 115 may be provided a weight 117, while the upstream end of arm 115 may be bent to project upward, as at 118, and there provided with an abutment member or stop block 119. Also, an operating arm 120 may extend downward from the arm 115 and terminate in a generally horizontal end portion 121 extending generally lengthwise of the conveyor.

In the illustrated embodiment, the stop mechanism 114 is located downstream of the displacing mechanism 60 a distance sufficient to permit a pair of articles or containers 122 to stand on the intermediate conveyor section 46 between the stop mechanism and the articles 99 in position to be laterally displaced.

When free to swing, the arm 115 rotates counterclockwise, to its solid-line position in FIGURE 5, under the influence of weight 117. The stop member 119 is thus swung upward into the path of movement of articles along intermediate conveyor section 46 for abutting engagement with an article moving therealong.

Serving to remove the stop member 119 from its obstructing position in the path of movement of articles along intermediate conveyor section 46, is a cam 124, see FIGURE 4, which is carried by an arm 125 movable horizontally into engagement with the stop-member arm portion 121 to depress the latter. The cam-carrying arm 125 may be connected to the pusher bars 96 and 97, as by a rigid angulate connecting member 126 extending over the path of articles along intermediate conveyor section 46 so as not to obstruct the latter.

Figure 7:
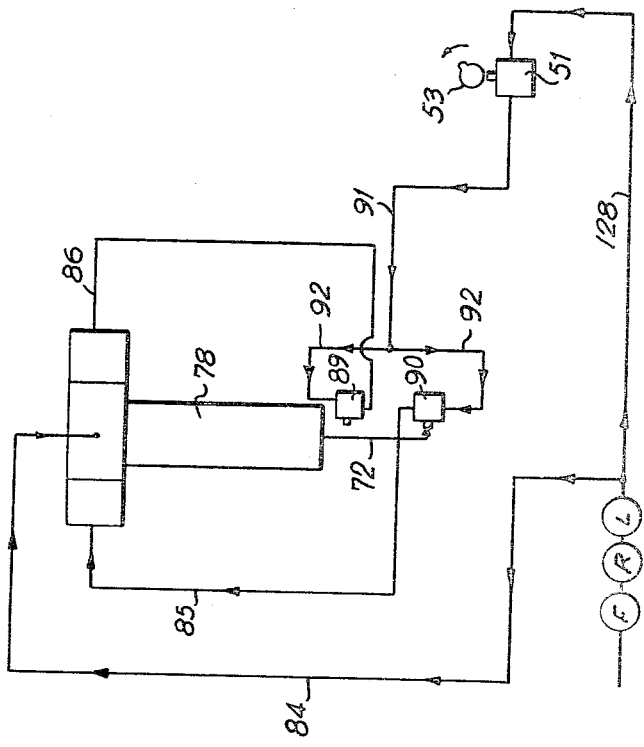
FIGURE 7 is a schematic representation of the control system of the instant apparatus.

In the schematic diagram of FIGURE 7 is shown the cylinder 78 and its supply conduit 84. In order to operate the rod 79 of cylinder 78 to shift carriage 72 in a selected one of its lateral directions of movement, fluid is passed through a proper one of conduits 85 and 86. This is controlled by opening of a desired one of valves 89 and 90, upon movement of carriage 72 in opposite directions of its reciprocation. In order that the particular valve 89, 90 opened by movement of carriage 72, may permit energization of the corresponding cylinder control, the valve 51 must be opened, as by rotation of rotor 53, as described hereinbefore. This permits passage of supply fluid through line 128 to effect control of cylinder 78 in the proper direction.

In the proper sequence of operation, the conveyor 20 serves to move the containers 122 and 99 into the position illustrated, as against stop 114. When in this position, the sensing means or rotor 53 operates switch 51 to effect operation of cylinder 78 and displace the articles 99 in one direction laterally of the conveyor 20. As illustrated, the pusher bars 96 and 97 are ready to displace the containers 99 laterally to the conveyor section 47. This lateral container-displacing action serves to move cam arm 25 and cause cam 124 to depress stop-mechanism arm portion 121. The stop member 119 is thus lowered to permit further movement downstream of the containers 122 along the intermediate conveyor section. Simultaneously, the containers 57 are moving downstream along the intermediate conveyor section 46 and being sensed by the rotor 53. When the prescribed number of containers 57 occupy the illustrated positions of containers 122 and 99, the cylinder 78 will again be actuated, but in the opposite lateral direction to effect lateral displacement of four containers onto the conveyor section 48, once again lowering the stop member 119 for repetition of the above-described cycle.

It will thus be appreciated that each complete cycle of operation, as described hereinbefore, serves to shift four containers laterally into each outer or side conveyor section 47 and 48, while permitting four containers to remain in the intermediate conveyor section. Thus, upon accumulation of the containers at a collection station, as at the left in FIGURE 1, an equal number of containers will accumulate on each conveyor section. The containers may then be very readily removed for packing, say a dozen to a case, or otherwise, as desired.

From the foregoing, it is seen that the present invention provides a method and apparatus for handling articles which fully accomplish their intended objects and are well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

I claim:

1. Article-handling apparatus comprising a conveyor mounted for movement along a predetermined path and having a longitudinally extending primary section and a longitudinally extending side section alongside said primary section, sensing means adjacent to said conveyor for sensing articles passing along the primary conveyor section, displacing means adjacent to said conveyor downstream of said sensing means and movable laterally across said primary section to displace a quantity of articles laterally from said primary section to said side section, and operating means connected between said sensing means and said displacing means for operating the latter responsive to the passage of a predetermined number of articles past said sensing means, said displacing means being sized to laterally displace a quantity of articles less than the number sensed by said sensing means.

2. Apparatus according to claim 1, in combination with stop means mounted for movement into and out of the path of movement of articles along said primary section for holding the latter against movement with said conveyor, said operating means being connected to said stop means to move the latter in timed relation with said displacing means.

3. Article-handling apparatus comprising a conveyor mounted for movement along a predetermined path and having a longitudinally extending primary section and a pair of longitudinally extending side sections on opposite sides of said primary section, sensing means adjacent to said conveyor for sensing articles passing along the primary section, displacing means adjacent to said sensing means and movable laterally in opposite directions across said primary section to displace separate quantities of articles laterally from said primary section alternately to opposite side sections, and operating means connected between said sensing means and displacing means for operating the latter responsive to the passage of a predetermined number of articles past said sensing means, said displacing means being sized to laterally displace a quantity of articles equal to two-thirds the number sensed by said sensing means.

References Cited by the Examiner

UNITED STATES PATENTS

| | | | |
|---|---|---|---|
| 646,469 | 4/1900 | Sleeper | 198—31 |
| 2,928,520 | 3/1960 | Boehler | 198—31 |

FOREIGN PATENTS 921,571  3/1963  Great Britain.

EVON C. BLUNK, *Primary Examiner.*

EDWARD A. SROKA, *Examiner.*